US012738396B2

(12) United States Patent
Caliani et al.

(10) Patent No.: US 12,738,396 B2
(45) Date of Patent: Sep. 15, 2026

(54) ENERGY HARVESTING SYSTEM FOR HARVESTING ELECTRIC ENERGY FROM A POWER CABLE AND AN ILLUMINATING SYSTEM FOR ILLUMINATING SAID POWER CABLE USING THE ELECTRIC ENERGY HARVESTED BY THE ENERGY HARVESTING SYSTEM

(71) Applicant: Prysmian S.p.A., Milan (IT)

(72) Inventors: Kleber Beloni Caliani, Sorocaba (BR); Ênio Roberto Da Silva Cunha, Sorocaba (BR); João Carlos Vieira Da Silva, Sorocaba (BR); João Batista Rosolem, Sorocaba (BR); Marcio Colazza Argentato, Sorocaba (BR); Claudio Floridia, Sorocaba (BR); Fabio Renato Bassan, Sorocaba (BR); João Roberto Nogueira Junior, Sorocaba (BR); Jose Luis Navia, Santiago de Chile (CL); Marcelo Lopes Da Silva, Sorocaba (CL); Artur de Araujo Silva, Sorocaba (BR)

(73) Assignee: Prysmian S.p.A., Milan (IT)

( * ) Notice: Subject to any disclaimer, the term of this patent is extended or adjusted under 35 U.S.C. 154(b) by 141 days.

(21) Appl. No.: 18/019,633

(22) PCT Filed: May 21, 2021

(86) PCT No.: PCT/IB2021/054410

§ 371 (c)(1),
(2) Date: Feb. 3, 2023

(87) PCT Pub. No.: WO2022/029513

PCT Pub. Date: Feb. 10, 2022

(65) Prior Publication Data

US 2023/0290541 A1 Sep. 14, 2023

(30) Foreign Application Priority Data

Aug. 5, 2020 (IT) ........................ 102020000019372

(51) Int. Cl.
*H01B 9/02* (2006.01)
*F21V 33/00* (2006.01)
(Continued)

(52) U.S. Cl.
CPC ............... *H01B 9/02* (2013.01); *F21V 33/00* (2013.01); *H02J 50/001* (2020.01); *F21Y 2115/10* (2016.08); *F21Y 2115/20* (2016.08)

(58) Field of Classification Search
CPC .......... H02J 5/005; H02J 7/025; H02J 7/0052; H02J 7/345; H02J 50/001; H01B 7/36;
(Continued)

(56) References Cited

U.S. PATENT DOCUMENTS 7,029,137 B2 4/2006 Lionetti et al.
8,167,471 B1 * 5/2012 Moritz .................. H01B 7/366 362/582
(Continued)

FOREIGN PATENT DOCUMENTS

AU 2020232373 A1 * 9/2021 .............. E21F 17/06
CA 2881362 A1 * 2/2014 ................ F21S 4/26
(Continued)

OTHER PUBLICATIONS

Gulati, Manoj, et al., "Capharvester: A Stick-On Capacitive Energy Harvester Using Stray Electric Field From Ac Power Lines", Proc. ACM Interact. Mob. Wearable Ubiquitous Technol. 2, 3, Article 110 (Sep. 2018), 20 pages.
(Continued)

*Primary Examiner* — William H. Mayo, III
(74) *Attorney, Agent, or Firm* — Slater Matsil, LLP

(57) ABSTRACT

Energy harvesting system for harvesting electric energy from a power cable including a power cable having at least
(Continued)

one core that includes in a radial direction: an electric conductor; an insulation system surrounding the electric conductor comprising at least an insulating layer; a ground shield surrounding the insulation system; and at least one insulated metallic electrode positioned between the electric conductor and the ground shield. At least a part of an outer surface of the at least one insulated metallic electrode is not in direct contact with the ground shield. The at least one insulated metallic electrode is spaced from the electric conductor.

19 Claims, 11 Drawing Sheets

(51) Int. Cl.
*H02J 50/00* (2016.01)
*F21Y 115/10* (2016.01)
*F21Y 115/20* (2016.01)

(58) Field of Classification Search
CPC .......... H01B 9/02; H01B 13/02; H01B 13/14; H01B 17/36; F21Y 2115/10; F21Y 2115/20; H01F 3/06; F21S 4/26; H02G 7/00; G01R 31/12; G01R 15/06
USPC .......... 174/110 R, 112, 113 R, 115; 362/278, 362/511, 551, 554, 555, 582, 640; 439/106, 489–490, 910
See application file for complete search history.

(56) References Cited

U.S. PATENT DOCUMENTS

| | | | | |
|---|---|---|---|---|
| 10,014,091 | B2 | 7/2018 | Lopez Gomez et al. | |
| 2009/0200059 | A1* | 8/2009 | Cinquemani | H01B 9/025 174/113 R |
| 2010/0084920 | A1 | 4/2010 | Banting et al. | |
| 2015/0214746 | A1* | 7/2015 | Lopez Gomez | H01B 7/0275 29/605 |
| 2018/0159367 | A1 | 6/2018 | Louzir et al. | |

FOREIGN PATENT DOCUMENTS

| | | | | |
|---|---|---|---|---|
| EP | 2947466 | A1 | 11/2015 | |
| WO | 2015039664 | A1 | 3/2015 | |
| WO | WO-2020055666 | A1 * | 3/2020 | G01K 7/42 |
| WO | 2022029513 | A1 | 2/2022 | |

OTHER PUBLICATIONS

International Search Report and Written Opinion, PCT Application No. PCT/IB2021/054410, mailed Jun. 30, 2021, 12 pages.

Rodríguez, Juan Carlos, et al., "Energy Harvesting from Medium Voltage Electric Fields using Pulsed Flyback Conversion", 2016 IEEE 8th International Power Electronics and Motion Control Conference (IPEMC-ECCE Asia), Hefei, 2016, pp. 3591-3598, doi: 10.1109/IPEMC.2016.7512871, 8 pages.

Yang, Feng et al., "Magnetic and Electric Energy Harvesting Technologies in Power Grids: A Review", Sensors. 20.1496. 10.3390/s20051496, Sensors, Mar. 9, 2020, 12 pages.

* cited by examiner 100
110
111
102
101
21
27
24
26
22
23

100
110
111
102
101
124
123
120
125
126
128
122
127
31
121
20

100
110
111
102
101
120
124
123
125
126
127
128
122
121
20
31
21
26
23
22
25

ENERGY HARVESTING SYSTEM FOR HARVESTING ELECTRIC ENERGY FROM A POWER CABLE AND AN ILLUMINATING SYSTEM FOR ILLUMINATING SAID POWER CABLE USING THE ELECTRIC ENERGY HARVESTED BY THE ENERGY HARVESTING SYSTEM

CROSS-REFERENCE TO RELATED APPLICATIONS

This application is a National Stage of International Application No. PCT/IB2021/054410, filed on May 21, 2021, which claims priority to Italian Patent Application No. 102020000019372, filed on Aug. 5, 2020. Both of the aforementioned applications are hereby incorporated by reference in their entireties.

TECHNICAL FIELD

The present disclosure refers to an energy harvesting system for harvesting electric energy from a power cable and to an illuminating system for illuminating said power cable using the electric energy harvested by the energy harvesting system. This is particularly but not exclusively useful for signaling the power cables in dark environments, such as for example the mines.

BACKGROUND

In the following, just for the sake of clarity, we make reference to the application scenario of the mines.

In this specification, the expression "high voltage" (HV) indicates voltages equal or greater than 35 KV, whereas the expression "medium voltage" (MV) indicates voltages comprised between 1 KV and 35 KV.

Typically a MV or HV power cable comprises at least one cable core comprising an electric conductor surrounded by an insulation system and a ground shield. The insulation system can comprise sequentially in a radial direction an inner polymeric semiconductive layer, and at least one polymeric insulating layer. The insulation system is surrounded by a ground shield, which can comprise a polymeric semiconductive layer and/or an outer metallic shield.

The illumination of MV or HV power cables applied to the mining industry is of great interest for the control and maintenance of the related industrial processes. Generally, these high energy power cables are used to supply power to large mobile equipment in mines, such as shovels and draglines, that use these cables over distances that can vary from two hundred to six hundred meters.

Usually, the power cable is connected to an electric energy receiving point and is dragged along the mine floor up to the point where the shovel or dragline is connected. In this path, when there is low illumination, other large vehicles, such as trucks, can pass over the power cable causing it to break. The breaking of the power cable generates a great burden on companies due to the stoppage of the shovel or dragline during the maintenance time of the broken cable.

As a way to solve accidents with the power cable that lead to its breaking, illuminated power cables are used. The lighting of the power cable improves its visualization for truck drivers, decreasing the probability of breaking the cable.

However, in the usual mine environments it is often not easy to provide the energy for illuminating the power cables since illuminating systems usually require a lower voltage compared to the one applied to the cable, therefore the light source associated to the power cable must have its own power supply source. In some cases, batteries and power converters are employed, but they may be costly, heavy or not reliable solutions. Energy harvesting systems appear to be suitable means to provide the energy required to the illuminating system. At this aim it is possible to extract the electric energy from the power cable, in particular from the magnetic field associated to the current flowing in the power cable or from the electric field associated to the voltage to which the power cable is subjected.

The magnetic field, in particular, depends on the electric current that passes through the power cable which can vary due to the load. If a variable load is used, a variable current will result and thus an intermittent illumination will occur. The known energy harvesting systems based on the harvesting of the magnetic field therefore have the drawback to produce electric energy depending on the load connected to the power cable.

On the other hand, the known energy harvesting systems based on the harvesting of electric field are external with respect to the power cable that indeed must be without the ground shield. The safety of these systems cannot be assured in case of MV or HV power cables.

Document U.S. Ser. No. 10/014,091 B2, describes an energy extraction system for illuminating cables which comprises one or more power cables, which may be three-phase or single-phase, and an energy extraction device for extracting energy from a power cable through the energy of the magnetic field of the cable itself.

Document US20100084920A1 describes a current transforming harvester ("CTH") is capable of producing power from a conductor on a preexisting power grid without alteration of the conductor or the preexisting power grid. The CTH includes a current transformer ("CT") that captures energy via magnetic flux from the conductor.

Document U.S. Pat. No. 8,167,471B1, describes a self-illuminating extension cord consists of an extension cord including a plurality of lights adorning the exterior of said cord in a spiraling pattern that runs the entire length of the extension cord. The extension cord includes a male plug at a first end and a female plug at a second end. The plurality of lights receive electrical power from the male plug.

Document U.S. Pat. No. 7,029,137B2 describes a cable having a first terminal end, a second terminal end, and a light emitting member that extends on the cable between the first and second terminal ends. The light emitting member is illuminated in response to manipulation of the light emitting member. The cable is then traceable from end to end.

Document WO2015039664A1 describes an energy harvesting device for harvesting energy from electrical cables. The energy harvesting device is configured to surround a portion of an electrical cable. The energy harvesting device comprises a plurality of electrically separated and electrically conducting patch members configured to be arranged in such a manner that an electric potential difference is provided between a first outlet point and a second outlet point. The patch members are electrically connected to the first outlet point and to the second outlet point. The patch members are configured to be attached directly onto the electrical cable or in close proximity of the cable.

The paper of Manoj Gulati, Farshid Salemi Parizi, Eric Whitmire, Sidhant Gupta, Shobha Sundar Ram, Amarjeet Singh, and Shwetak N. Patel, "Capharvester: A Stick-On Capacitive Energy Harvester Using Stray Electric Field From Ac Power Lines", Proc. ACM Interact. Mob. Wearable Ubiquitous Technol. 2, 3, Article 110 (September 2018) describes a stick-on capacitive energy harvester that extracts energy from power cables using stray electric-field.

The paper of Juan Carlos Rodriguez, Donald Grahame Holmes, Brendan Peter McGrath and Carlos Teixeira, "Energy Harvesting from Medium Voltage Electric Fields using Pulsed Flyback Conversion", 2016 IEEE 8th International Power Electronics and Motion Control Conference (IPEMC-ECCE Asia), Hefei, 2016, pp. 3591-3598, doi: 10.1109/IPEMC.2016.7512871, describes a system for capturing high voltage cable with capacitors and a discrete capacitive divider, mounted outside the cable itself.

The paper of Feng Yang, Lin U, Huizong Yu and Peilin Huang, "Magnetic and Electric Energy Harvesting Technologies in Power Grids: A Review", Sensors. 20. 1496. 10.3390/s20051496 describes electric harvesting methods in the grid-magnetic field energy harvesting and electric field energy harvesting.

SUMMARY

The Applicant faced the problem of providing an energy harvesting system for harvesting electric energy from a power cable that can be applied to power cables provided with a ground shield.

Then the Applicant considered to provide an insulated metallic electrode between the insulation system of a core of a power cable and the ground shield wherein at least a part of the outer surface of the insulated metallic electrode is not in direct contact with the ground shield and wherein the insulated metallic electrode is spaced from the electric conductor. In this way, the Applicant observed that the insulated metallic electrode and the electric conductor form a capacitor that is charged bringing the insulated metallic electrode to an electric potential higher than the ground potential of the ground shield. It is possible, then, to extract electric energy from the power cable by harvesting the electric field between the insulated metallic electrode and the ground shield.

Therefore, according to a first aspect, the present disclosure relates to an energy harvesting system for harvesting electric energy from a power cable comprising a power cable comprising at least one core that comprises in a radial direction: an electric conductor; an insulation system surrounding the electric conductor comprising at least an insulating layer; a ground shield surrounding the insulation system; at least one insulated metallic electrode positioned between the electric conductor and the ground shield, wherein at least a part of an outer surface of said at least one insulated metallic electrode is not in direct contact with the ground shield and wherein the at least one insulated metallic electrode is spaced from the electric conductor.

In an embodiment, the ground shield comprises a semiconductive layer. In this case the ground shield can also comprise a metallic layer surrounding the semiconductive layer. In an embodiment, the at least one insulated metallic electrode is made in form of a metallic strip describing an are substantially coaxial with respect to the at least one core.

In an alternative embodiment, the energy harvesting system comprises a plurality of said insulated metallic electrodes which are made in form of metallic wires arranged along a circumference substantially coaxial with respect to the at least one core.

In a further alternative embodiment, the insulated metallic electrode is made in form of a metallic ring substantially coaxial with respect to the at least one core.

In an embodiment, the at least one insulated metallic electrode comprises an electrode insulating layer.

The electrode insulating layer can be made by enamel, or by a tape or by extruded polymer.

In an embodiment the at least one insulated metallic electrode is in direct contact with said insulating layer.

In an embodiment, in the case in which the ground shield comprises a semiconductive layer the at least one insulated metallic electrode is in direct contact with the semiconductive layer of the ground shield.

In an embodiment, the energy harvesting system comprises electrical connectors connected to the insulated metallic electrode and to the ground shield respectively, wherein said connectors are arranged to be connected to further electrical terminals.

According to a second aspect, the present disclosure relates to an illuminating system for illuminating a power cable wherein the illuminating system comprises: the energy harvesting system above described; at least one system of lighting sources coupled to an outer surface of a respective core or to an outer surface of the power cable and having a first ground terminal directly or indirectly electrically connected to the ground shield and a second terminal directly or indirectly electrically connected to the at least one insulated metallic electrode of a respective core.

The system of lighting sources is then powered by the energy harvesting system integrated in the core itself. The illuminating system results to be completely energy independent and safe.

In an embodiment, the illuminating system comprises at least one safety and/or conditioner device having two input terminals electrically connected to the ground shield and to the at least one insulated metallic electrode respectively and two output terminals electrically connected to the first ground terminal and to the second terminal of the system of lighting sources respectively, wherein the at least one safety and/or conditioner device is configured for protecting the system of lighting sources against over-currents and/or over-voltages and/or for rectifying the voltage across the input terminals.

In an embodiment, the at least one safety and/or conditioner device is mounted at one respective end of the power cable.

In an alternative embodiment, the illuminating system comprises a plurality of said safety and/or conditioner device mounted along the power cable at predefined lengths.

In an embodiment, the system of lighting sources comprises a LED strip wound on the outer surface of the respective core or on the outer surface of the power cable.

In an alternative embodiment the system of lighting sources comprises an electroluminescent wire wound on the outer surface of the respective core or on the outer surface of the power cable.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Also, the terms "a" and "an" are employed to describe elements and components of the disclosure. This is done merely for convenience and to give a general sense of the disclosure. This description should be read to include one or at least one, and the singular also includes the plural unless it is obvious that it is meant otherwise.

As "insulating layer" it is meant a layer made of a material having a conductivity comprised between $10^{-16}$ and $10^{-14}$ S/m.

As "semiconductive layer" it is meant a layer made of a material having a conductivity comprised between $10^{-1}$ and 10 S/m.

BRIEF DESCRIPTION OF THE DRAWINGS

Further characteristics will be apparent from the detailed description given hereinafter with reference to the accompanying drawings, in which:

FIG. 3 shows also a detail enlarged view of a box housed in the terminal connector.

DETAILED DESCRIPTION OF ILLUSTRATIVE EMBODIMENTS

Figure 1A:
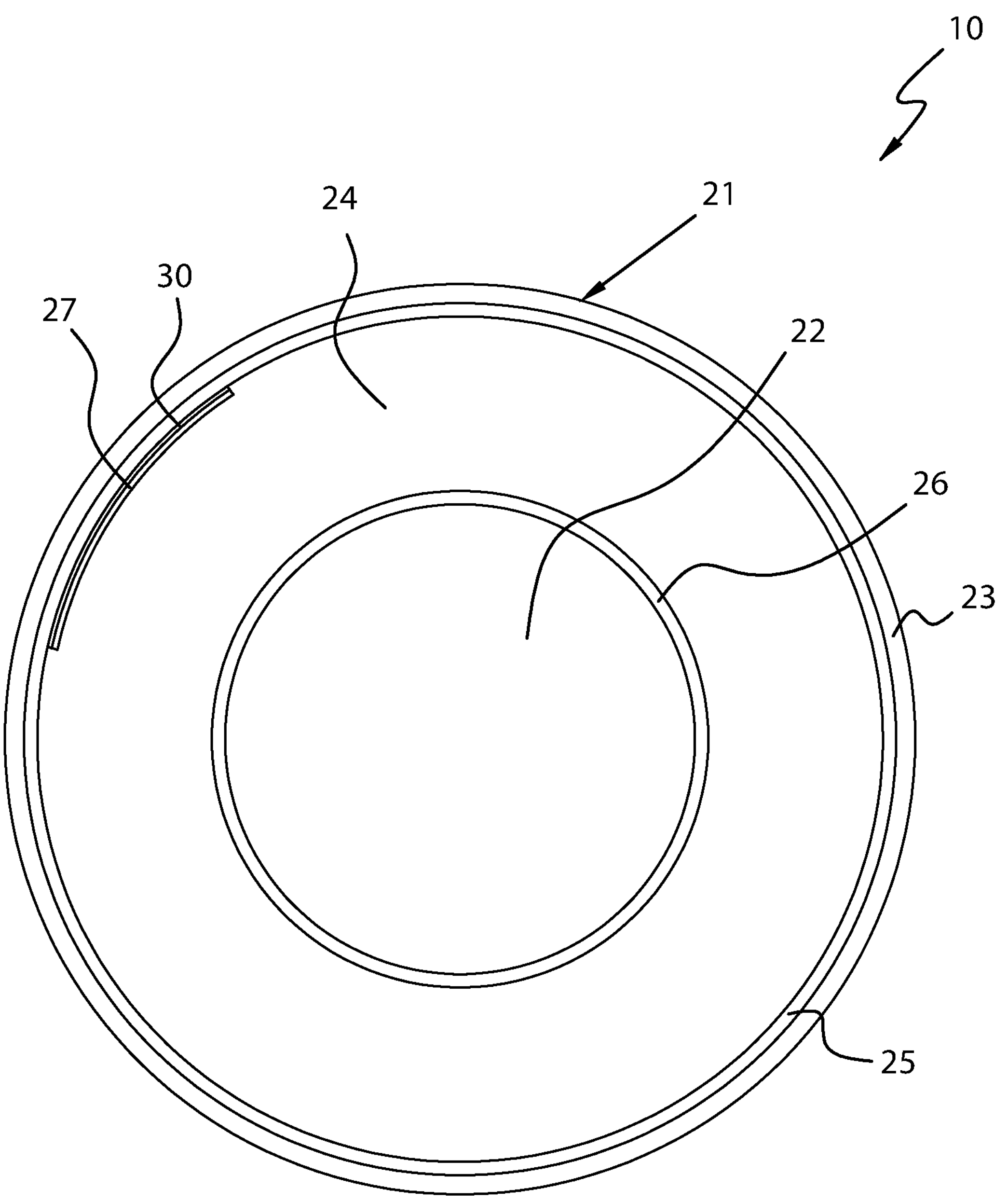
FIG. 1A, 1B, 1C, 1D are four schematic cross-sectioned views of an energy harvesting system according to four embodiments of the present disclosure.

With reference to the enclosed figures, an energy harvesting system 10 according to the present disclosure is schematically represented.

The energy harvesting system 10 comprises a power cable 20 comprising at least one core 21. For example the power cable can be a three-phase power cable with three cores or a single-phase with one core.

In any case, the at least one core 21 comprises in a radial direction an electric conductor 22, an insulation system surrounding the electric conductor 22 and a ground shield 23, 25 surrounding the insulation system.

In different embodiments, the ground shield 23, 25 comprises a first semiconductive layer 25 surrounding the insulating system. In some of the embodiments, the ground shield 23, 25 comprises also a metallic sheath, for example made by copper or aluminum, surrounding the first semiconductive layer 25.

The insulation system comprises at least an insulating layer 24.

The insulation system can comprise also a second inner semiconductive layer 26 surrounding the electric conductor 22 and surrounded by the insulating layer 24.

For example, the insulating layer 24 can be made of cross-linked EPR (ethylene propylene rubber), or of EPR (ethylene propylene rubber), or of XLPE (crosslinked polyethylene), or of PVC (Polyvinyl Chloride), PE (Polyethylene), or of ECTFE (ethylene chlorotrifluoroethylene), or of PVDF (Polyvinylidene fluoride), or of Nylon.

For example the semiconductive layers 25, 26 can be made of thermoplastic polymer chosen from one of the following: low density polyethylene (LDPE), linear low-density polyethylene (LLDPE), medium density polyethylene (MDPE), and ethylene vinyl acetate (EVA).

According to the present disclosure, the at least one core 21 comprises also at least one insulated metallic electrode 27, 28, 29 positioned between the electric conductor 22 and the ground shield 23, 25 wherein at least a part of an outer surface of said at least one insulated metallic electrode 27, 28, 29 is not in direct contact with the ground shield 23, 25 and wherein the at least one insulated metallic electrode 27, 28, 29 is spaced from the electric conductor 22.

The fact that the at least a part of the outer surface of the at least one insulated metallic electrode 27, 28, 29 is not in direct contact with the ground shield 23, 25, means that the at least one insulated metallic electrode 27, 28, 29 is never completely integrated inside the ground shield 23, 25. In this way, the at least one insulated metallic electrode 27, 28, 29 is at least in part in direct contact with a layer set between the electric conductor 22 and the ground shield 23, 25. Said layer at least in part in direct contact with the at least one insulated electrode 27, 28, 29, has an electric potential different from the ground potential of the ground shield 23, 25. Therefore, also the electric potential of the at least one insulated electrode 27, 28, 29 will be different from the ground potential when the cable is energized.

For example, the at least one insulated metallic electrode 27, 28, 29 can be made of copper or aluminum.

The at least one insulated metallic electrode 27, 28, 29 can be made in form of a metallic strip 27 describing an arc substantially coaxial with respect to the at least one core 21. In this case the metallic strip 27 faces a respective are portion of the electric conductor 22 with the interposition of part of the insulation system.

Alternatively, the insulated metallic electrode 27, 28, 29 can be made in form of a metallic ring 28 substantially coaxial with respect to the at least one core. In this case, the metallic ring 28 completely surrounds the electric conductor 22.

In a further alternative, the energy harvesting system 10 comprises a plurality of insulated metallic electrodes which are made in form of metallic wires 29 arranged along a circumference substantially coaxial with respect to the at least one core 21.

In any case, the at least one insulated metallic electrode 27, 28, 29 can comprise an electrode insulating layer 30, 32, 33 that covers at least partially the metallic outer surface of the at least one insulated metallic electrode 27, 28, 29.

The electrode insulating layer 30, 32, 33 can be made by enamel, or by a tape or by extruded polymer.

For example, the insulating cover 30 can be made of Polyvinyl Formal, Acetal, Polyvinyl Acetal, polyurethane, polyurethane and external coating polyamide.

In some embodiments, the at least one insulated metallic electrode 27, 28, 29 is in direct contact with the insulating layer 24.

In some embodiments, the at least one insulated metallic electrode 27, 28, 29 is in direct contact with the first semiconductive layer 25 of the ground shield 23, 25.

Figure 1B:
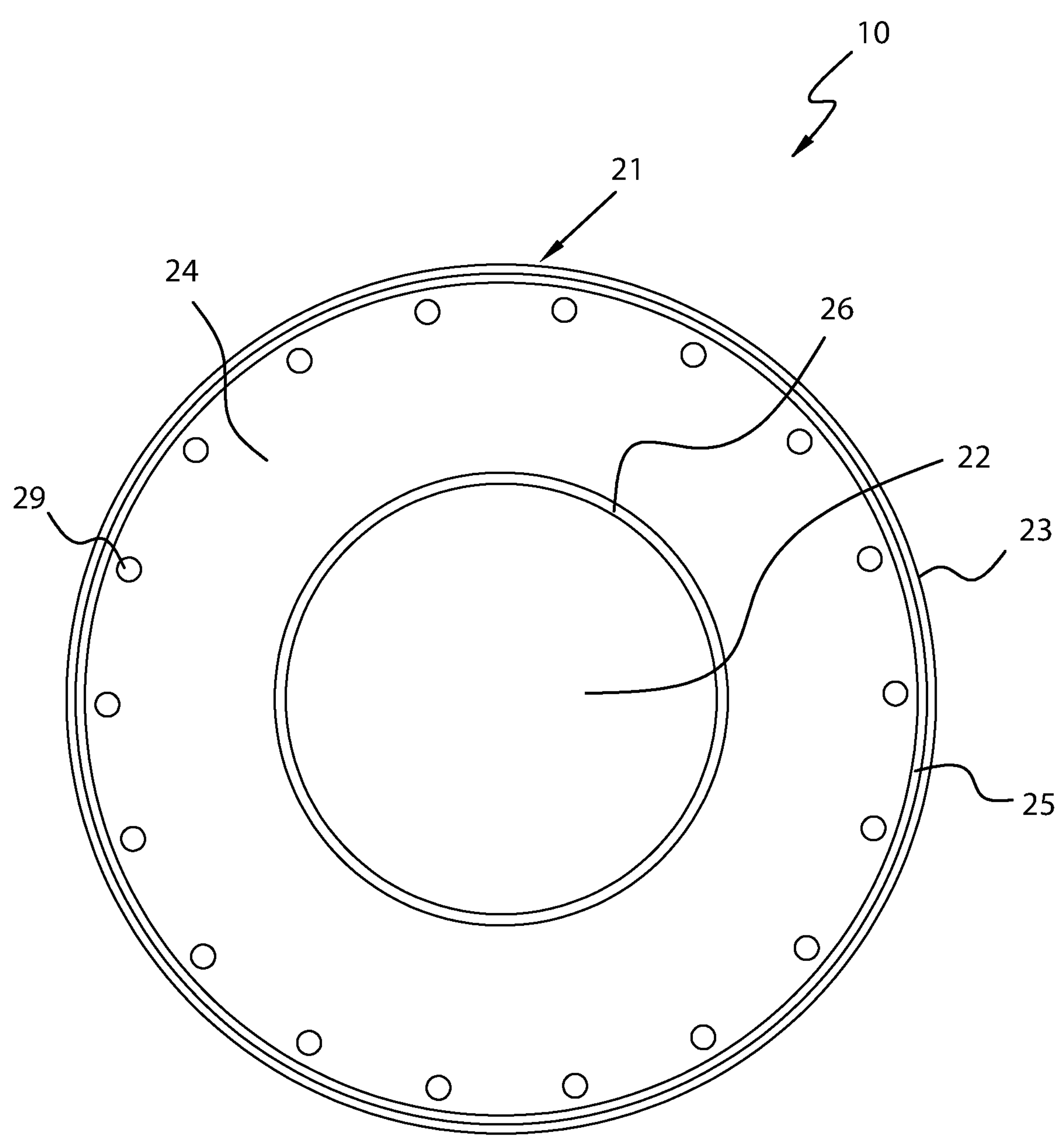
Figure 1C:
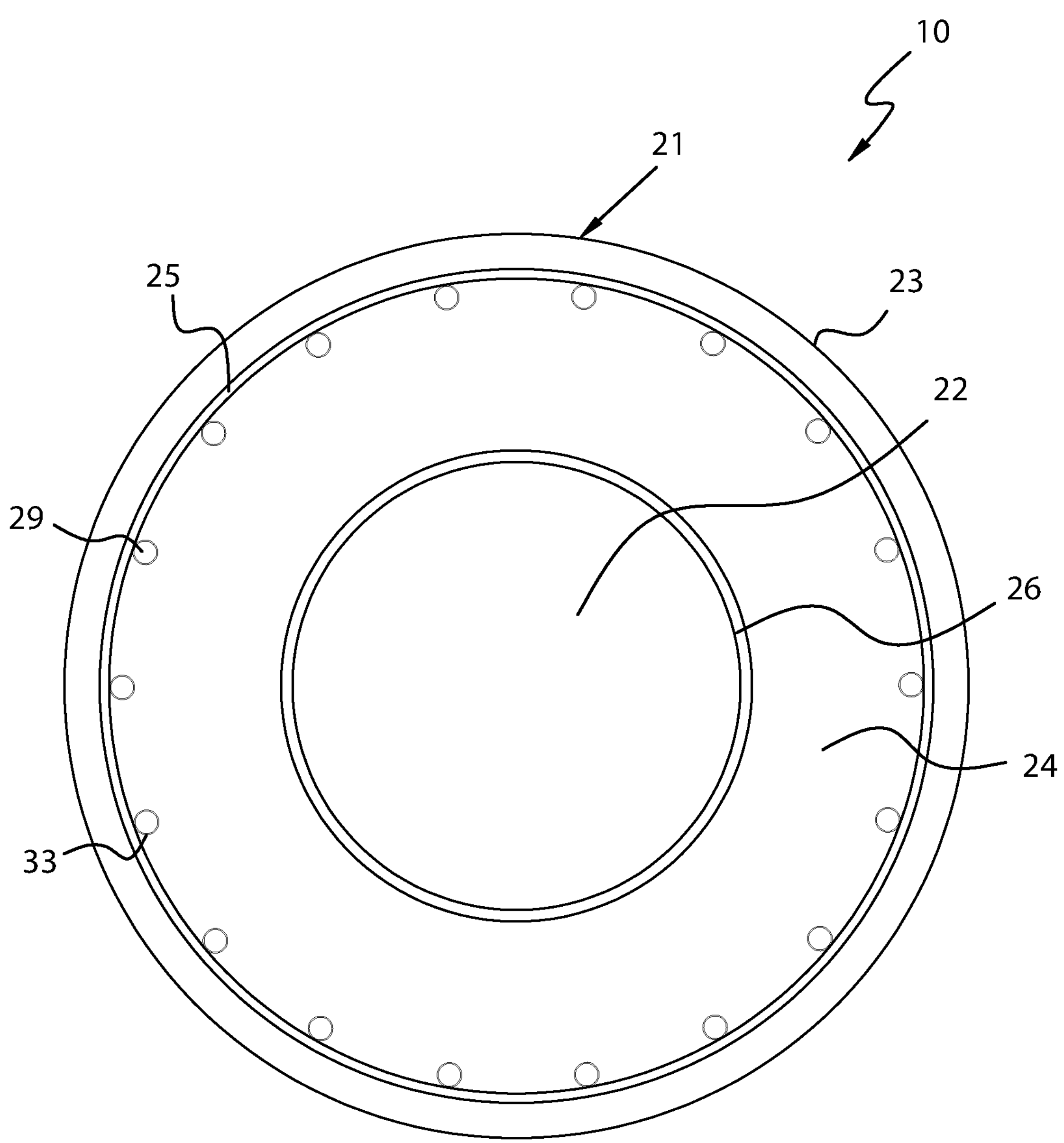
Figure 1D:
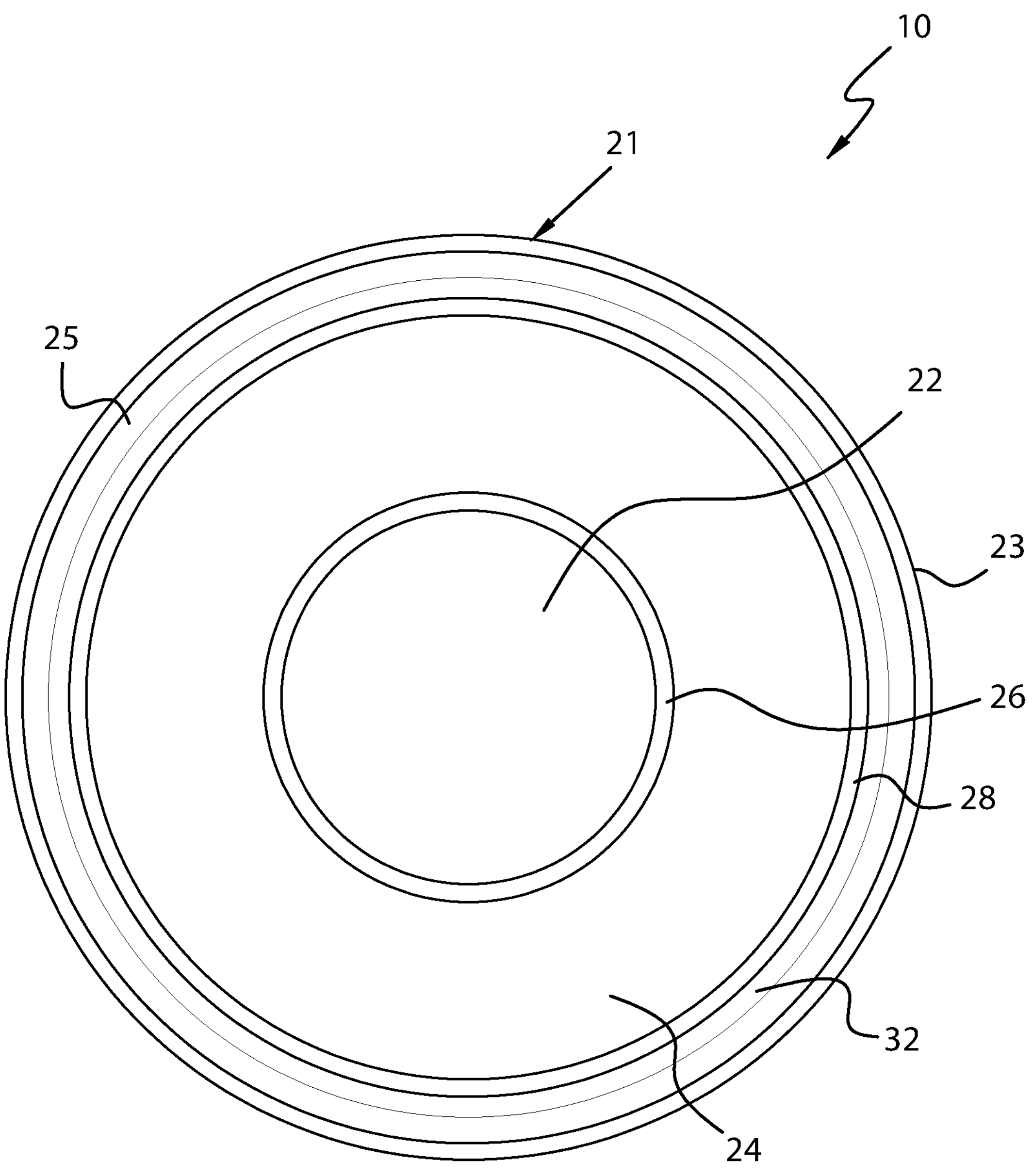

The at least one insulated metallic electrode 27, 28, 29 can be, then, positioned so as to directly contact the insulating layer 24 and the ground shield 23, 25; more in particular the at least one insulated metallic electrode 27, 28, 29 can be positioned so as to directly contact the insulating layer 24 and the first semiconductive layer 25 as illustrated in FIGS. 1A, 1C and 1D.

In this case, the at least one insulated metallic electrode 27, 28, 29 must be provided with the electrode insulating layer 30, 32, 33 at least at the interfaces with the first semiconductive layer 25 since the at least one insulated metallic electrode 27, 28, 29 needs to be at a different electric potential with respect to the first semiconductive layer 25.

Alternatively, the at least one insulated metallic electrode 27, 28, 29 can be completely integrated in the insulating layer 24 as illustrated in FIG. 1B.

In this case, the at least one insulated metallic electrode 27, 28, 29 can be made also without the electrode insulating layer 30, 32, 33 because the insulation is provided by the insulating layer 24 of the insulation system.

Preferably, the energy harvesting system 10 comprises electrical connectors connected to the insulated metallic electrode 27, 28, 29 and to the ground shield 23, 25 respectively, wherein said connectors are arranged to be connected to further electrical terminals. In this way the energy harvesting system can be electrically connected to an external device so as to power it with the harvested energy.

The energy harvesting system 10 can be used in an illuminating system 100 for illuminating the power cable of the energy harvesting system 10. Such an illuminating system 100 comprises the energy harvesting system 10 and at least one system of lighting sources 110 coupled to an outer surface of a respective core 21 or of the power cable and having a first ground terminal 101 directly or indirectly electrically connected to the ground shield 23, 25 and a second terminal 102 directly or indirectly electrically connected to the at least one insulated metallic electrode 27, 28, 29 of the respective core 21.

The system of lighting sources 110 can comprise a LED strip 11 wound on the outer surface of the respective core 21 or on the outer surface of the power cable 20.

Alternatively the system of lighting sources 110 can comprise an electroluminescent wire wound on the outer surface of the respective core 21 or on the outer surface of the power cable 20.

Figure 2A:
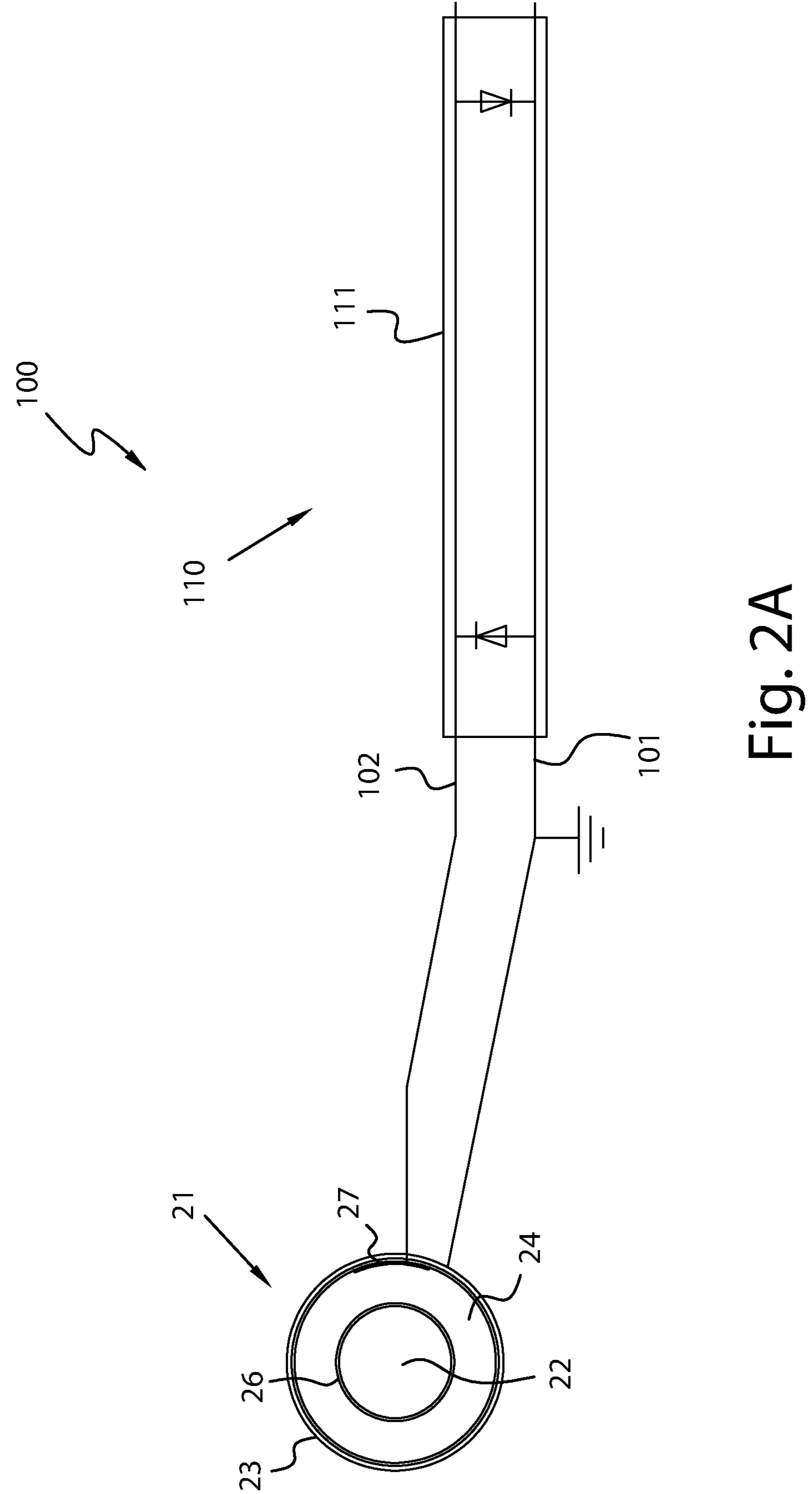
FIG. 2A, 2B, 2C, 2D, 2E, 2F are six schematic views of an illuminating system according to five embodiments of the present disclosure.
Figure 2B:
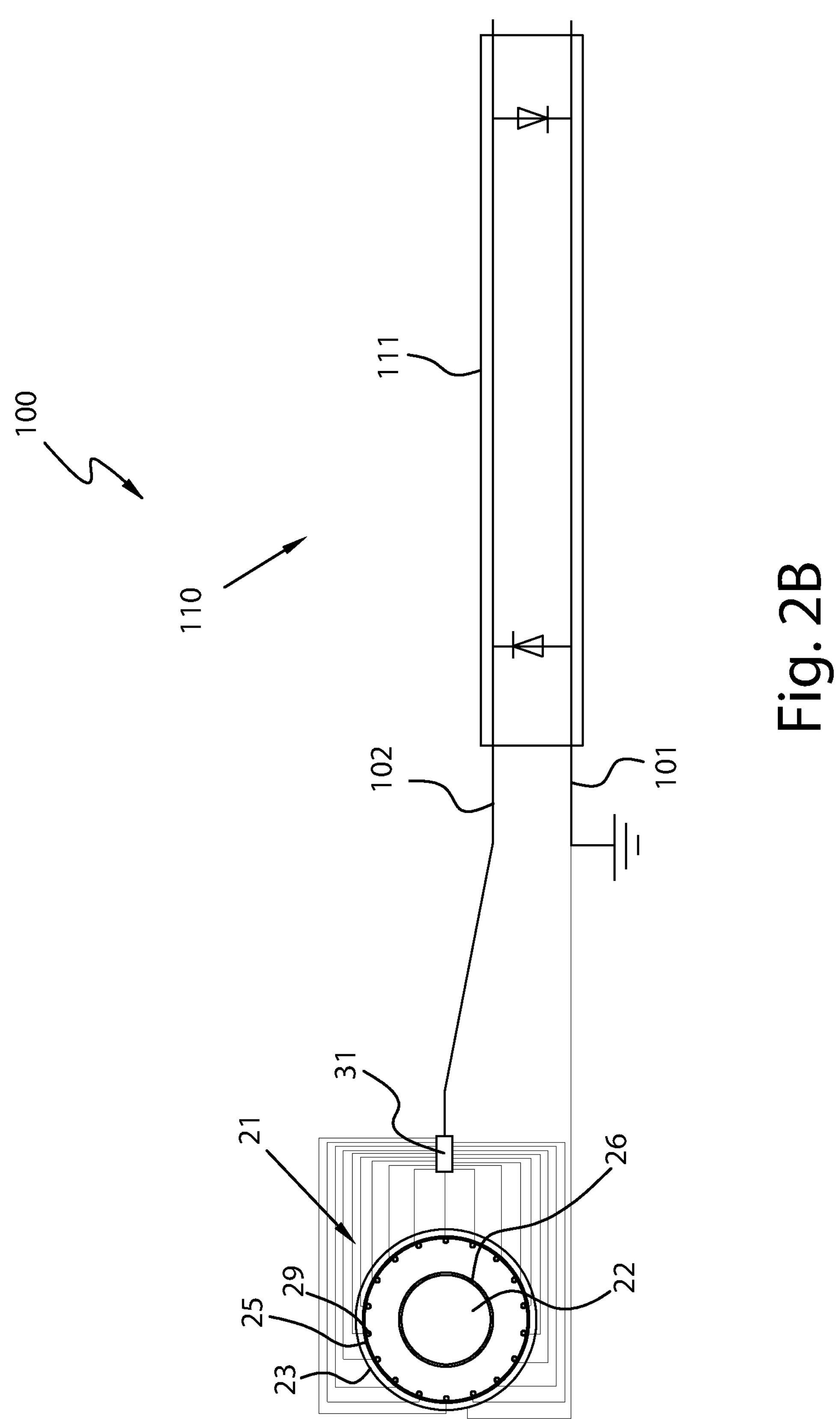
Figure 2C:
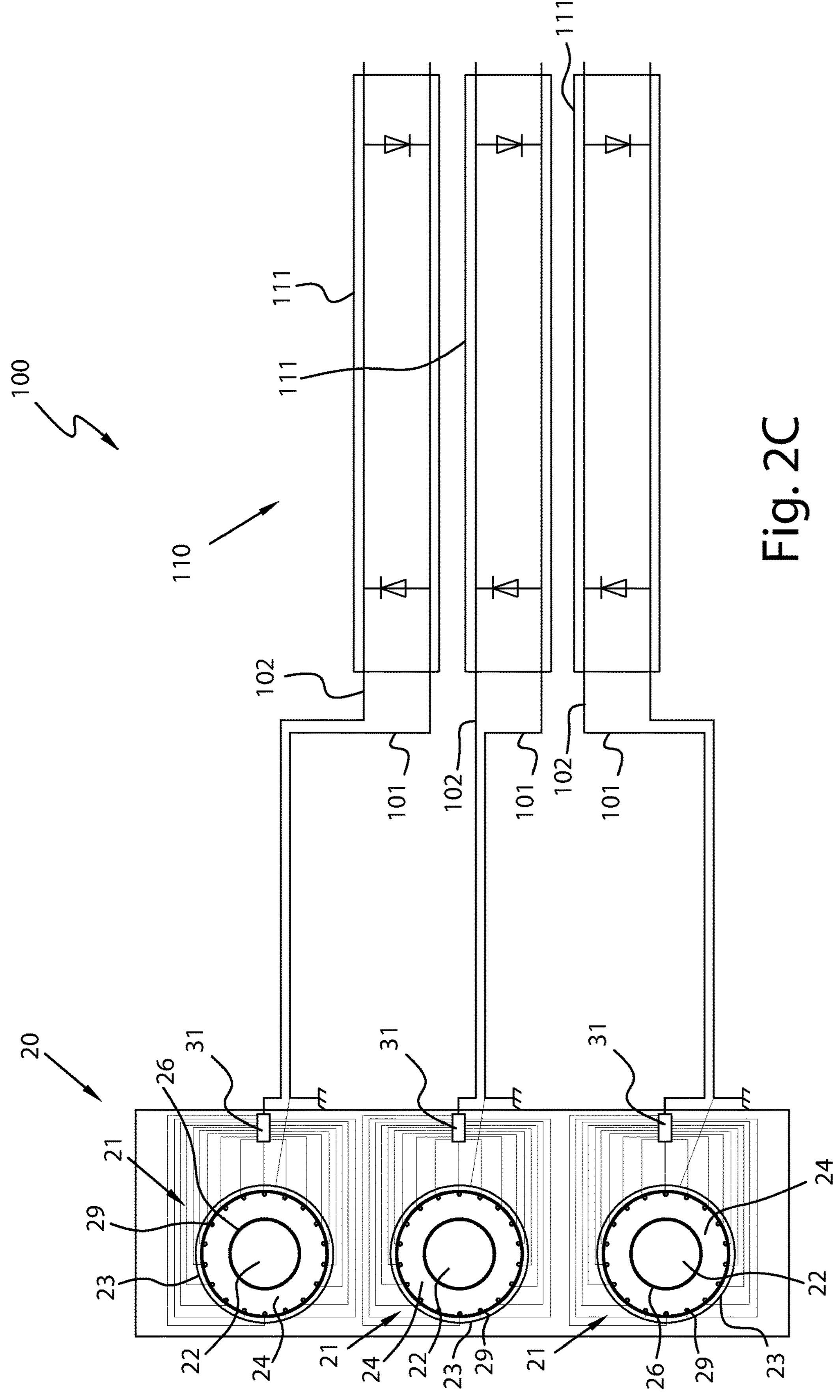

FIGS. 2A, 2B and 2C show three embodiment in which the system of lighting sources 110 comprises a LED strip in, and the first ground terminal 101 and the second terminal 102 are directly connected to the ground shield 23, 25 and to the at least one insulated metallic electrode 27, 28, 29.

In particular, in this case the LEDs of the LED strip 111 are configured to be direct and reversely polarized by the potential difference across the two input terminals; in this way the LED strip 111 is powered during the positive cycle as well as in the negative cycle of the sinusoidal harvested voltage. Therefore, the LED strip 111 emits light without interruptions.

Moreover, in case the at least one core 21 of the energy harvesting system 10 comprises a plurality of insulated metallic electrodes 27, 29 as illustrated in FIG. 2C the insulated metallic electrodes 27, 29 are electrically connected to a single-node 31 which is then electrically connected to the second terminal 102 of the system of lighting sources.

Figure 2D:
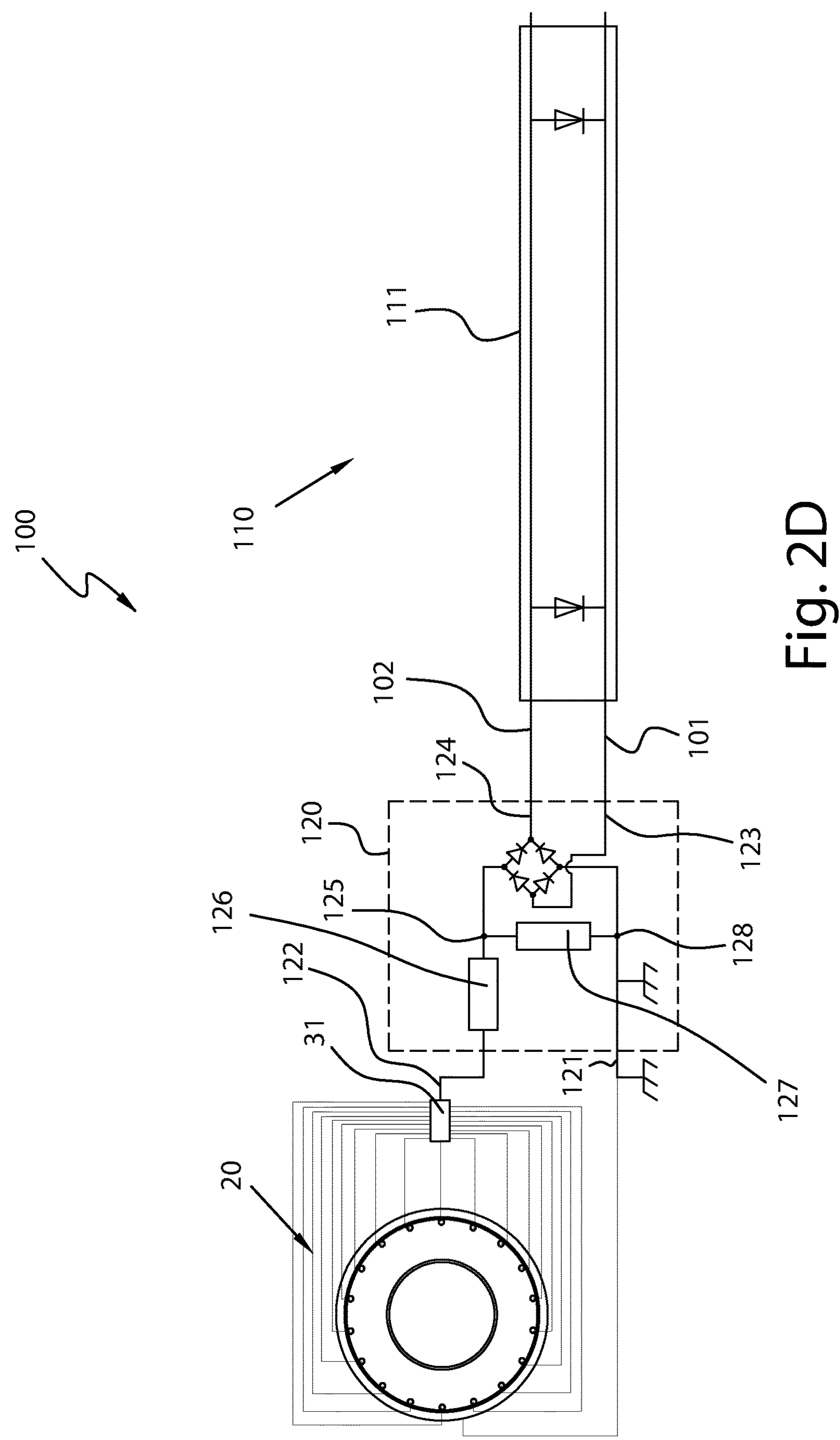
Figure 2E:
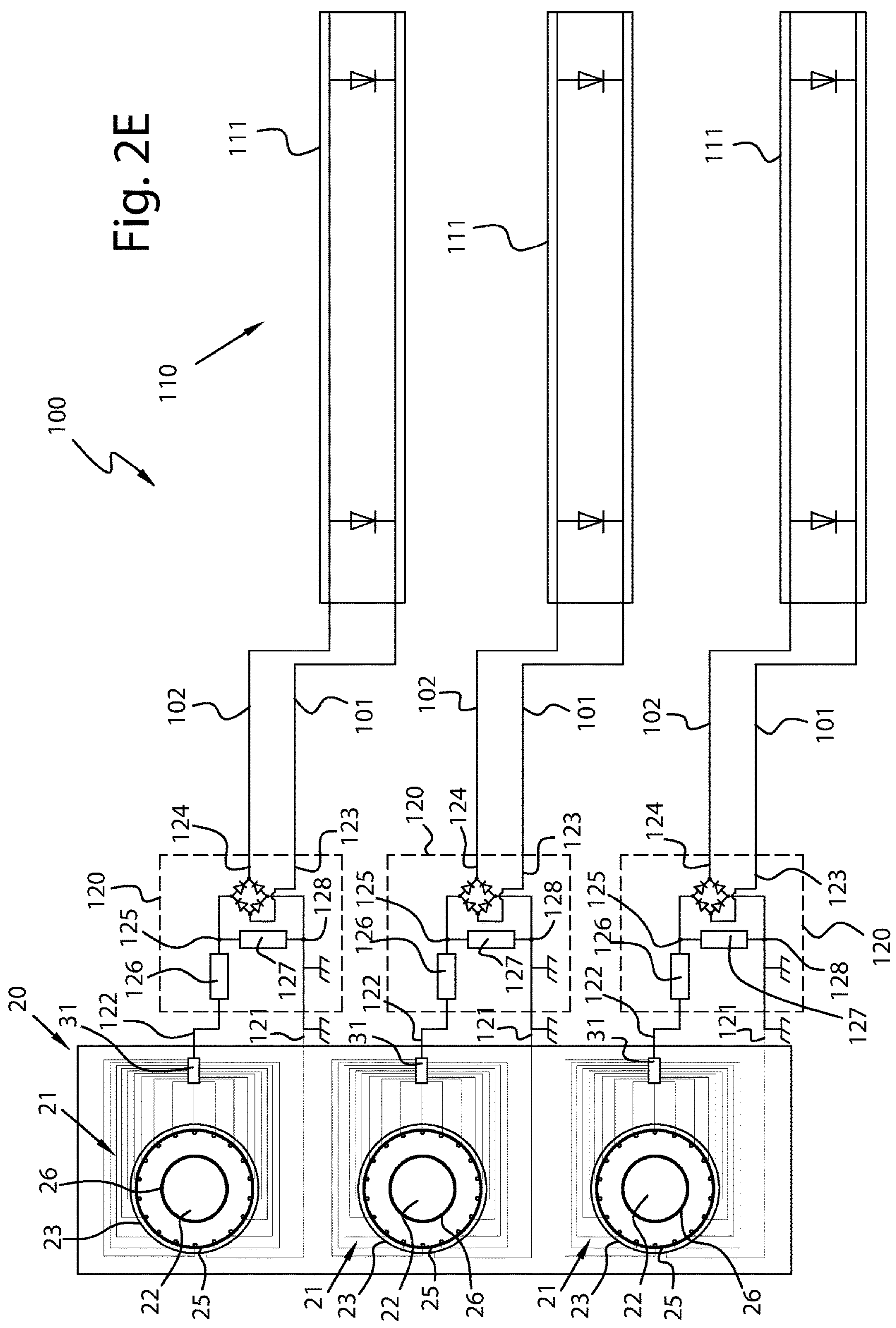

FIGS. 2D and 2E show two embodiment wherein the illuminating system 100 comprises at least one safety and/or conditioner device 120 having two input terminals 121, 122 electrically connected to the ground shield 23, 25 and to the at least one insulated metallic electrode 27, 28, 29 respectively and two output terminals 123, 124 electrically connected to the first ground terminal 101 and to the second terminal 102 of the system of lighting sources 110 respectively.

In particular, the at least one safety and/or conditioner device 120 is configured for protecting the system of lighting sources 110 against over-currents and/or over-voltages and/or is configured for rectifying the voltage across the input terminals 121, 122 of the safety and/or conditioner device 120.

Figure 2F:
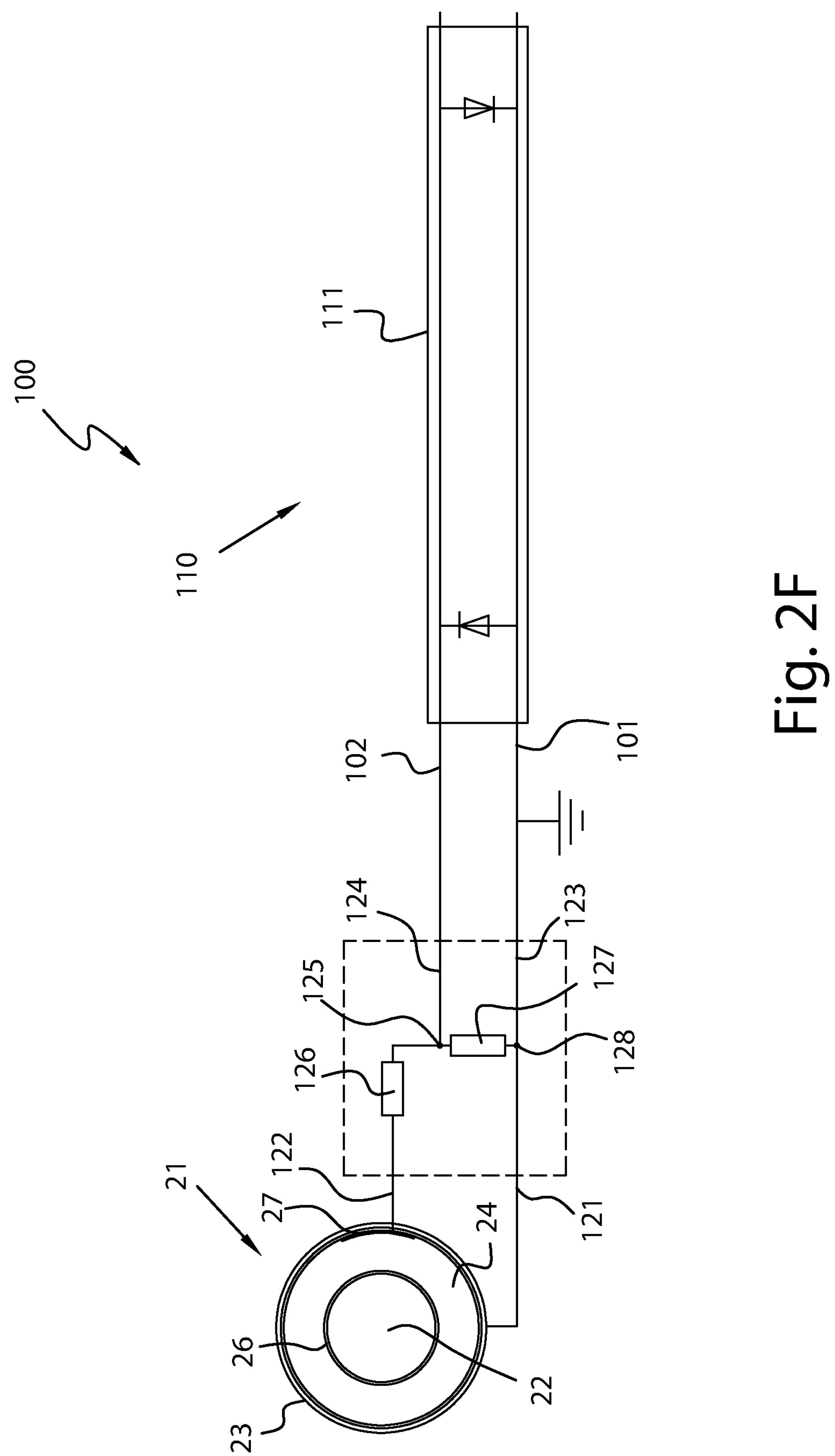

The safety and/or conditioner device 120 can comprise a protection circuit as illustrated in FIG. 2F or a rectifier circuit or a combination of a protection circuit and a rectifier circuit as illustrated in FIGS. 2D and 2E.

The protection circuit for example comprises a fuse 126 to provide protection against over-currents and a varistor 127 (Voltage Dependent Resistor) to provide protection against over-voltages. For example, the protection circuit can comprise a fuse 126 electrically connected between a second input terminal 122 of the at least one safety and/or conditioner device 120 and a first node 125 that can be directly connected to a second output terminal 124 of the at least one safety and/or conditioner device 120. Moreover, the protection circuit can comprise also a varistor 127 electrically connected between the node first 125 and a second node 128 that is directly connected to a first terminal 121 of the at least one safety and/or conditioner device 120 and that can be directly connected to a first output terminal 123 of the at least one safety and/or conditioner device 120. In FIG. 2F the at least one safety and/or conditioner device 120 comprises only a protection circuit. In this case, the first node 125 is directly connected to the second output terminal 124 and the second node 128 is directly connected to the first output terminal 123. Also in this case the LEDs of the LED strip 11 are configured to be direct and reversely polarized by the potential difference across the two input terminals; in this way the LED strip 11 is powered during the positive cycle as well as in the negative cycle of the sinusoidal harvested voltage. Therefore, the LED strip 11 emits light without interruptions.

Differently, in FIGS. 2D and 2E the at least one safety and/or conditioner device 120 comprises a rectifier circuit, for example a full wave rectifier or half wave rectifier connected in cascade to the protection circuit. In the particular embodiment illustrated in FIGS. 2D and 2E the rectifier circuit at one side is connected to the first node 125 and to the second node 128 of the protection circuit and at the other side connected to the output terminals 123, 124.

In case the at least one safety and/or conditioner device 120 comprises a rectifier circuit the LEDs of the LED strip 11 are configured to be direct polarized. The at least one safety and/or conditioner device 120 can be housed in a box and can be mounted at one respective end of the power cable 20.

Figure 3:
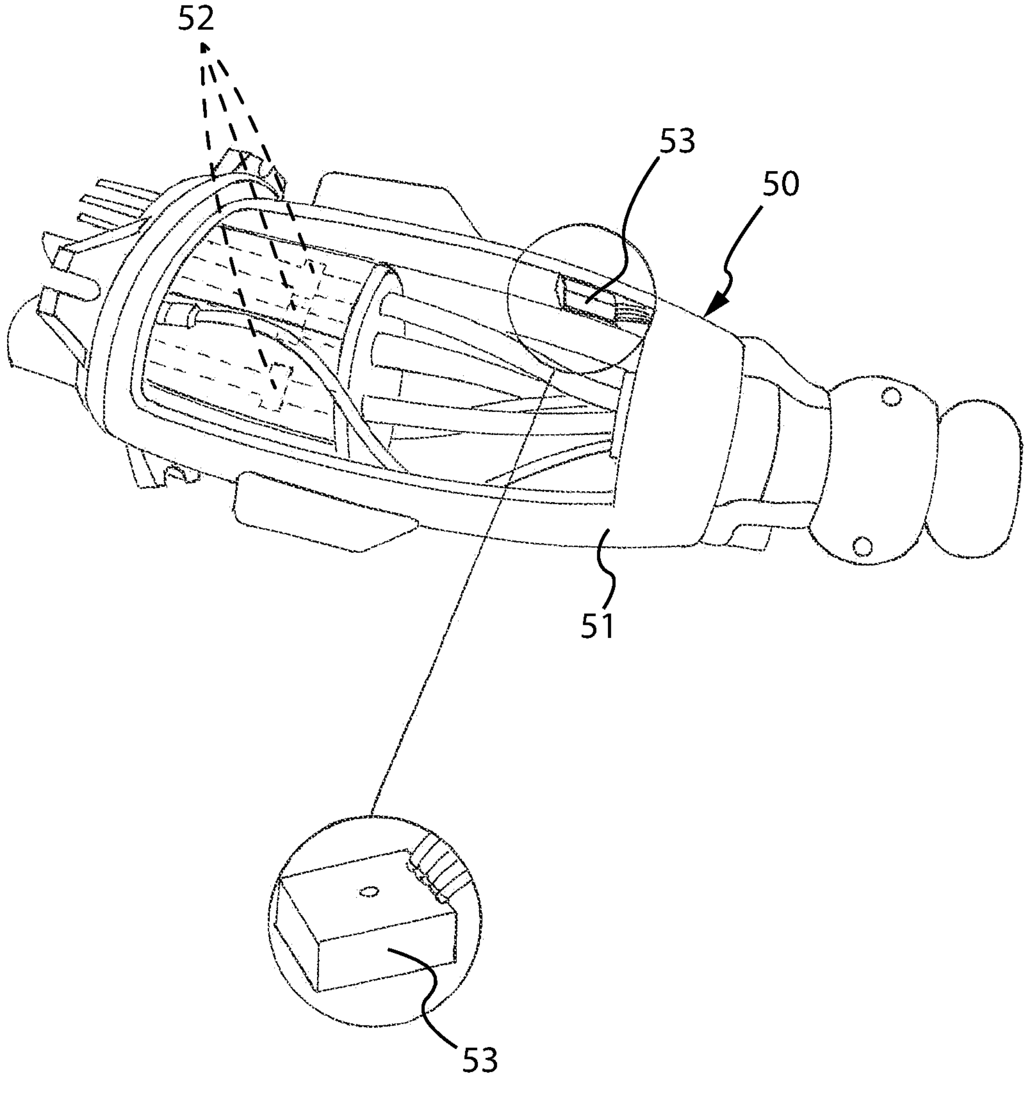
FIG. 3 is a schematic perspective view of a terminal connector provided at the end of a power cable included in an embodiment of the illuminating system according to the present disclosure.

In particular, in some embodiments, the power cable 20 is provided at least at one end with a terminal connector 50 adapted to be connected to an end of another power cable or to a power source or to a device; the terminal connector 50 comprises a case 51 inside which electrical contacts 52 are provided. These electrical contacts 52 are adapted to be connected from one side to the at least one core 21 and from the other side to the respective core of the other power cable or to a power source or to a device. In this embodiments the at least one safety and/or conditioner device 120 is housed in a box 53 mounted inside the case 51 of the terminal connector 50. In particular, the box 53 can be is fixed to a wall of the case 51 as depicted in FIG. 3. The box 53 contains all the electronic components of the at least one safety and/or conditioner device 120 leaving accessible the two input terminals 121, 122 and the two output terminals 123, 124.

The electrical connections between the at least one safety and/or conditioner device 120 and the ground shield 23, 25, the at least one insulated metallic electrode 27, 28, 29, the first ground terminal 101 and to the second terminal 102 of the system of lighting sources 110 are made inside the case 51 of the terminal connector 50, thus resulting safe and reliable not being exposed to the exterior. Moreover, the placement of the at least one safety and/or conditioner device 120 inside the case 51 allows to maintain the continuity of the power cable 20 and an easy access to the at least one safety and/or conditioner device 120.

In case the illuminating system 100 comprise a plurality of the safety and/or conditioner device 120 they can be mounted along the power cable 20 at predefined lengths.

The invention claimed is:

1. A power cable comprising:

an energy harvesting system for harvesting electric energy from within the power cable, the power cable comprising at least one core that comprises in a radial direction:

an electric conductor;

an insulation system surrounding the electric conductor, the insulation system comprising a first insulating layer;

a ground shield surrounding the insulation system; and at least one insulated metallic electrode positioned between the electric conductor and the ground shield, wherein the at least one insulated metallic electrode comprises a second insulating layer covering at least partially metallic outer surfaces of the at least one insulated metallic electrode, wherein at least a part of an outer surface of the at least one insulated metallic electrode is not in direct contact with the ground shield, wherein the at least one insulated metallic electrode is spaced from the electric conductor, and wherein the at least one insulated metallic electrode is made in the form of a metallic strip describing an arc, the arc being substantially coaxial with respect to the at least one core.

2. The power cable according to claim 1, wherein the ground shield comprises a semiconductive layer.

3. The power cable according to claim 2, wherein the at least one insulated metallic electrode is in direct contact with the semiconductive layer of the ground shield.

4. The power cable according to claim 1, wherein the second insulating layer is made by enamel, or by a tape or by an extruded polymer.

5. The power cable according to claim 1, wherein the at least one insulated metallic electrode is in direct contact with the first insulating layer.

6. The power cable according to claim 1, further comprising electrical connectors connected to the insulated metallic electrode and to the ground shield respectively, wherein the electrical connectors are arranged to be connected to further electrical terminals.

7. An illuminating system for illuminating an electric power cable comprising:

the electric power cable comprising an energy harvesting system for harvesting electric energy from the electric power cable, the electric power cable comprising at least one core that comprises in a radial direction:

an electric conductor, an insulation system surrounding the electric conductor comprising at least an insulating layer, a ground shield surrounding the insulation system, and at least one insulated metallic electrode positioned between the electric conductor and the ground shield, wherein at least a part of an outer surface of the at least one insulated metallic electrode is not in direct contact with the ground shield, wherein the at least one insulated metallic electrode is spaced from the electric conductor, and wherein the at least one insulated metallic electrode is made in the form of a metallic strip describing an arc, the arc being substantially coaxial with respect to the at least one core; and at least one system of lighting sources coupled to an outer surface of a respective core or to an outer surface of the electric power cable and having a first ground terminal directly or indirectly electrically connected to the ground shield and a second terminal directly or indirectly electrically connected to the at least one insulated metallic electrode of a respective core.

8. The illuminating system according to claim 7, further comprising at least one safety and/or conditioner device having two input terminals electrically connected to the ground shield and to the at least one insulated metallic electrode respectively and two output terminals electrically connected to the first ground terminal and to the second terminal of the system of lighting sources respectively, wherein the at least one safety and/or conditioner device is configured for protecting the system of lighting sources against over-currents and/or over-voltages and/or the at least one safety and/or conditioner device is configured for rectifying the voltage across the input terminals.

9. The illuminating system according to claim 8, wherein the at least one safety and/or conditioner device is mounted at one respective end of the electric power cable.

10. The illuminating system according to claim 8, further comprising a plurality of the safety and/or conditioner devices mounted along the electric power cable at predefined lengths.

11. The illuminating system according to claim 7, wherein the system of lighting sources comprises an LED strip wound on the outer surface of the respective core.

12. The illuminating system according to claim 7, wherein the system of lighting sources comprises an electroluminescent tape wound on the outer surface of the respective core.

13. An illuminating system for illuminating an electric power cable comprising:

the electric power cable comprising an energy harvesting system for harvesting electric energy from the electric power cable, the electric power cable comprising at least one core that comprises in a radial direction:

an electric conductor, an insulation system surrounding the electric conductor comprising at least an insulating layer, a ground shield surrounding the insulation system, and at least one insulated metallic electrode positioned between the electric conductor and the ground shield, wherein at least a part of an outer surface of the at least one insulated metallic electrode is not in direct contact with the ground shield, wherein the at least one insulated metallic electrode is spaced from the electric conductor, and wherein the at least one insulated metallic electrode is made in the form of a metallic strip describing an arc, the arc being substantially coaxial with respect to the at least one core;

at least one system of lighting sources coupled to an outer surface of a respective core or to an outer surface of the electric power cable and having a first ground terminal directly or indirectly electrically connected to the ground shield and a second terminal directly or indirectly electrically connected to the at least one insulated metallic electrode of a respective core;

at least one safety and/or conditioner device having two input terminals electrically connected to the ground shield and to the at least one insulated metallic electrode respectively and two output terminals electrically connected to the first ground terminal and to the second terminal of the system of lighting sources respectively, wherein the at least one safety and/or conditioner device is configured for protecting the system of lighting sources against over-currents and/or over-voltages and/or the at least one safety and/or conditioner device is configured for rectifying the voltage across the input terminals; and a terminal connector provided at least at one end of the electric power cable, the terminal connector comprising a case inside which electrical contacts are provided, wherein the at least one safety and/or conditioner device is housed in a box mounted inside the case of the terminal connector.

14. The illuminating system according to claim 13, wherein the box is fixed to a wall of the case.

15. The illuminating system according to claim 13, wherein the system of lighting sources comprises an LED strip wound on the outer surface of the respective core.

16. The illuminating system according to claim 13, wherein the system of lighting sources comprises an electroluminescent tape wound on the outer surface of the respective core.

17. The illuminating system according to claim 13, wherein the at least one safety and/or conditioner device comprises a protection circuit including a fuse to provide protection against over-currents and a varistor to provide protection against over-voltages.

18. The illuminating system according to claim 13, wherein the at least one safety and/or conditioner device comprises a rectifier circuit.

19. The illuminating system according to claim 18, further comprising a protection circuit comprising a fuse and a varistor, wherein the rectifier circuit is connected in cascade to the protection circuit.

* * * * *